United States Patent
Wang et al.

(10) Patent No.: US 12,189,215 B2
(45) Date of Patent: Jan. 7, 2025

(54) FRONT CURVE DESIGN METHOD FOR PREPARING RESIN LENS WITH HIGH REFRACTIVE INDEX

(71) Applicants: Jiangsu Conant Optical Co., Ltd., Nantong (CN); Shanghai Conant Optical Co., Ltd., Shanghai (CN)

(72) Inventors: Chuanbao Wang, Nantong (CN); Hongbin Fan, Nantong (CN); Qingbo Yan, Nantong (CN); Qiu Du, Nantong (CN); Chunhong Wen, Nantong (CN); Kenny Schwartz, Shanghai (CN)

(73) Assignees: Jiangsu Conant Optical Co., Ltd., Nantong (CN); Shanghai Conant Optical Co., Ltd., Shanghai (CN)

( * ) Notice: Subject to any disclaimer, the term of this patent is extended or adjusted under 35 U.S.C. 154(b) by 531 days.

(21) Appl. No.: 17/647,257

(22) Filed: Jan. 6, 2022

(65) Prior Publication Data

US 2023/0070136 A1    Mar. 9, 2023

Related U.S. Application Data

(63) Continuation of application No. PCT/CN2021/116160, filed on Sep. 2, 2021.

(30) Foreign Application Priority Data

Aug. 24, 2021 (CN) .......................... 202110975944.0

(51) Int. Cl.
| | |
|---|---|
| *G02C 7/02* | (2006.01) |
| *C08G 18/18* | (2006.01) |
| *C08G 18/24* | (2006.01) |
| *C08G 18/38* | (2006.01) |
| *C08G 18/72* | (2006.01) |

(Continued)

(52) U.S. Cl.
CPC ............. *G02C 7/024* (2013.01); *C08G 18/18* (2013.01); *C08G 18/242* (2013.01); *C08G 18/3876* (2013.01); *C08G 18/722* (2013.01); *C08G 18/73* (2013.01); *C08G 18/758* (2013.01); *C08G 18/7642* (2013.01); *G02B 1/041* (2013.01); *G02C 2202/24* (2013.01)

(58) Field of Classification Search
CPC .... G02C 7/024; G02C 2202/24; G02C 7/022; C08G 18/18; C08G 18/242; C08G 18/3876; C08G 18/722; C08G 18/73; C08G 18/758; C08G 18/7642; G02B 1/041; C08L 75/04; C08L 81/00
USPC ..................... 351/41, 159.01, 159.73, 159.74
See application file for complete search history.

(56) References Cited

U.S. PATENT DOCUMENTS

| | | | | |
|---|---|---|---|---|
| 6,726,323 B2* | 4/2004 | Miyamura | ............... | G02C 7/04 351/159.14 |
| 8,500,273 B2* | 8/2013 | Tung | ...................... | G02C 7/047 351/159.79 |
| 2024/0103298 A1* | 3/2024 | Huang | ................... | G02C 7/044 |

* cited by examiner

*Primary Examiner* — Tuyen Tra
(74) *Attorney, Agent, or Firm* — CBM Patent Consulting, LLC

(57) ABSTRACT

A front curve design method for preparing a resin lens with a high refractive index. The method includes within a myopia power range of −1.00 to −15.00, designing the maximum design front curve to be −4.00 D from −1.00 to −3.50; designing the maximum design front curve to be −3.00 D from −3.75 to −5.50; designing the maximum design front curve to be −2.00 D from −5.75 to −8.75; and designing the maximum design front curve to be −1.50 D from −9.00 to −15.00. The method of the present invention is mainly suitable for resin lenses with a refractive index of 1.60, 1.67 or 1.74.

7 Claims, 7 Drawing Sheets

(51) Int. Cl.
*C08G 18/73* (2006.01)
*C08G 18/75* (2006.01)
*C08G 18/76* (2006.01)
*G02B 1/04* (2006.01)

FRONT CURVE DESIGN METHOD FOR PREPARING RESIN LENS WITH HIGH REFRACTIVE INDEX

CROSS REFERENCES

This application is the U.S. Continuation Application of International Application No. PCT/CN2021/116160 filed on 2 Sep. 2021 which designated the U.S. and claims priority to Chinese Application No. CN202110975944.0 filed on 24 Aug. 2021, the entire contents of each of which are hereby incorporated by reference.

TECHNICAL FIELD

The present invention relates to a front curve design method for preparing a resin lens with a high refractive index, and belongs to the technical field of resin lenses.

BACKGROUND

Resin lenses have the advantages of light weight, great impact resistance, excellent light transmission and low cost and can also meet special needs, such as improvement of dyeing performance, photochromic performance and anti-blue light performance. It can even change the mold design such as an aspherical mold, a progressive multifocus mold and a double-sided aspheric mold. Therefore, the resin lenses have become more and more popular among consumers. At present, with increasing popularity of electronic products, myopia of young people has become more and more serious. Thus, the resin lenses with a high refractive index have become more and more popular. Oblique astigmatism and spherical lens power errors are two very important indicators for the resin lenses with a high refractive index. The two important indicators are related to the design of front curve of the lenses.

SUMMARY

In view of the shortcomings of the prior art, an objective of the present invention is to provide a front curve design method for preparing a resin lens with a high refractive index. Problems of a geometric structure and performance during lens molding can be effectively solved, and spherical lens power errors and oblique astigmatism can be effectively reduced.

To achieve the foregoing objective, the present invention uses the following technical solutions:

A front curve design method for preparing a resin lens with a high refractive index includes within a myopia power range of −1.00 to −15.00, designing the maximum design front curve to be −4.00 D from −1.00 to −3.50; designing the maximum design front curve to be −3.00 D from −3.75 to −5.50; designing the maximum design front curve to be −2.00 D from −5.75 to −8.75; and designing the maximum design front curve to be −1.50 D from −9.00 to −15.00.

In the present invention, the maximum design front curve is the curve of a geometric center point of a lens.

Preferably, the front curve design method can be used for preparing a spherical lens, an aspheric lens or a multifocal lens.

Preferably, the resin lens with a high refractive index is a lens with a refractive index of 1.60, 1.67 or 1.74.

Preferably, the lens with a refractive index of 1.60 may include a mixture of 2,5 (or 2,6)-bis(isocyanatomethyl) bicyclo[2.2.1]heptane, hexamethylene diisocyanate, pentaerythritol tetra(3-mercaptopropionate) and 4-mercaptomethyl-3,6-dithia-1,8-octanedithiol as a monomer and an organotin catalyst as a catalyst.

Preferably, the lens with a refractive index of 1.67 may include 1,3-bis(isocyanatomethyl)benzene and bis(mercaptomethyl)-3,6,9-trithiaundecane-1,11-dithiol as a monomer and an organotin catalyst as a catalyst.

Preferably, the lens with a refractive index of 1.74 may include bis(2,3-epithiopropyl)disulfide and bis(mercaptomethyl)-3,6,9-trithiaundecane-1,11-dithiol as a monomer and an amine catalyst as a catalyst.

SEQ refers to a difference between a perceived average sphere and an expected sphere. CYL refers to the oblique astigmatism produced by each lens. The SEQ and the CYL are closely related to the front curve of a lens. The greater the front curve, the smaller the SEQ, and the better the CYL. In order to further reduce the oblique astigmatism, a greater front curve is required. Therefore, SEQ errors are slightly increased. For a 1.67 resin lens with a diameter of 70 mm, when the front curve is greater, there is an increase in the edge thickness, but only a small increase.

Compared with the existing technology, the beneficial effects achieved by the present invention are as follows:

The present invention provides a front curve design method for preparing a resin lens with a high refractive index. The maximum design front curve is limited, such that the problems of a geometric structure and performance during lens molding can be effectively solved, and the spherical lens power errors and the oblique astigmatism can be minimized.

DETAILED DESCRIPTION

The following further describes the present invention in detail with reference to the accompanying drawings. The following embodiments are only used to describe the technical solutions of the present invention more clearly, and cannot be used to limit the protection scope of the present invention.

In the present invention, a resin lens with a refractive index of 1.67 is selected and prepared into two lenses with the same power and different front curves. SEQ and CYL of the lenses are tested respectively, and results are as follows.

Example 1

Figure 1:
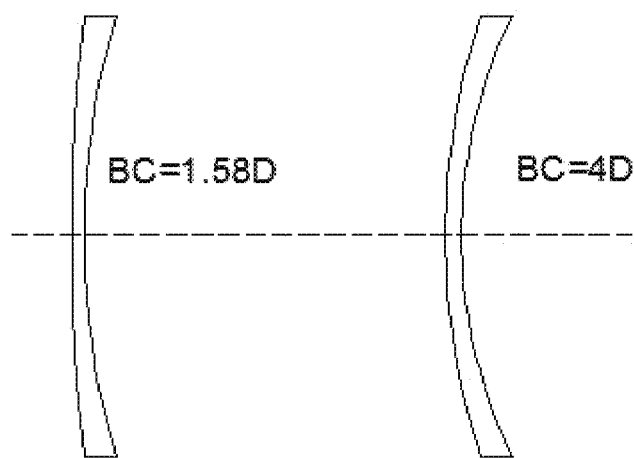
FIG. 1 shows schematic structural diagrams of two resin lenses in Example 1 of the present invention.

Two resin lenses with a refractive index of 1.67, the power of −3.00 and different front curves were shown in FIG. 1.

Figure 2:
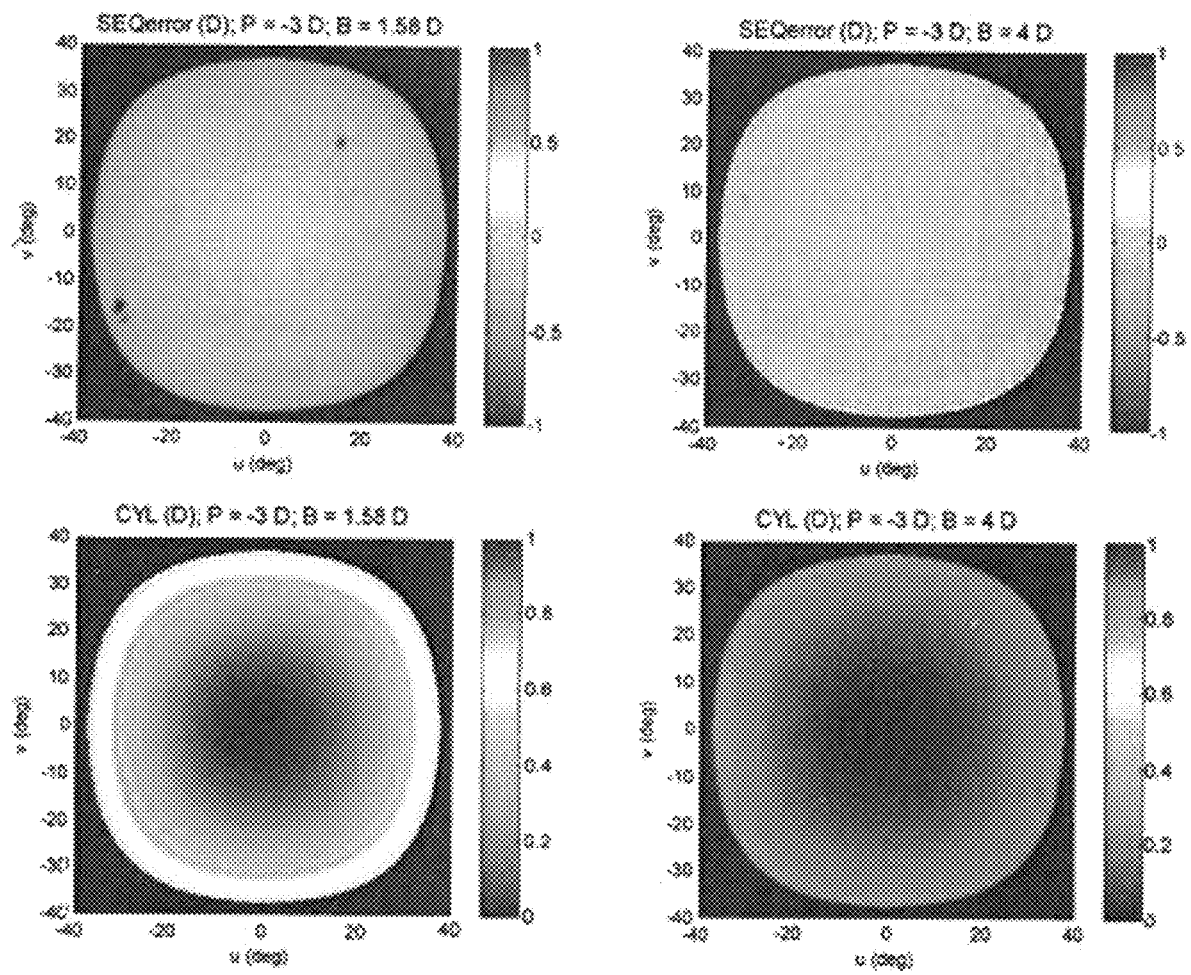
FIG. 2 shows an SEQ diagram and a CYL diagram of the two resin lenses in Example 1 of the present invention.

Parameters were shown in Table 1. The SEQ and CYL of the lenses were tested respectively, as shown in FIG. 2.

TABLE 1

Two resin lenses with a refractive index of 1.67, the power of −3.00 and different front curves

| BC(D) n = 1.530 | R$_1$ (mm) | R$_2$ (mm) | P$_1$(D) n = 1.667 | P$_2$(D) n = 1.667 | t$_{edg}$(mm) |
|---|---|---|---|---|---|
| 1.58 | 335.44 | 133.60 | 1.99 | −4.99 | 4.64 |
| 4 | 132.50 | 82.74 | 5.03 | −8.06 | 4.86 |

In the table: BC is base curve, R1 and R2 are semicircle diameters based on two roundnesses, P1 is front curve, P2 is back curve (the refractive index used in the test was 1.667), t is the edge thickness of the lens, and 667/530*BC=P1.

As shown in FIG. 2, the smaller the SEQ of the resin lens with the design curve of −4.00 D, the better the CYL.

Example 2

Figure 3:
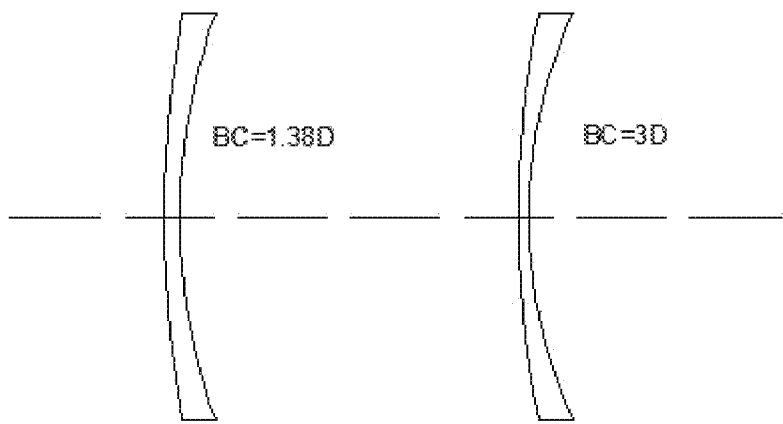
FIG. 3 shows schematic structural diagrams of two resin lenses in Example 2 of the present invention.
Figure 4:
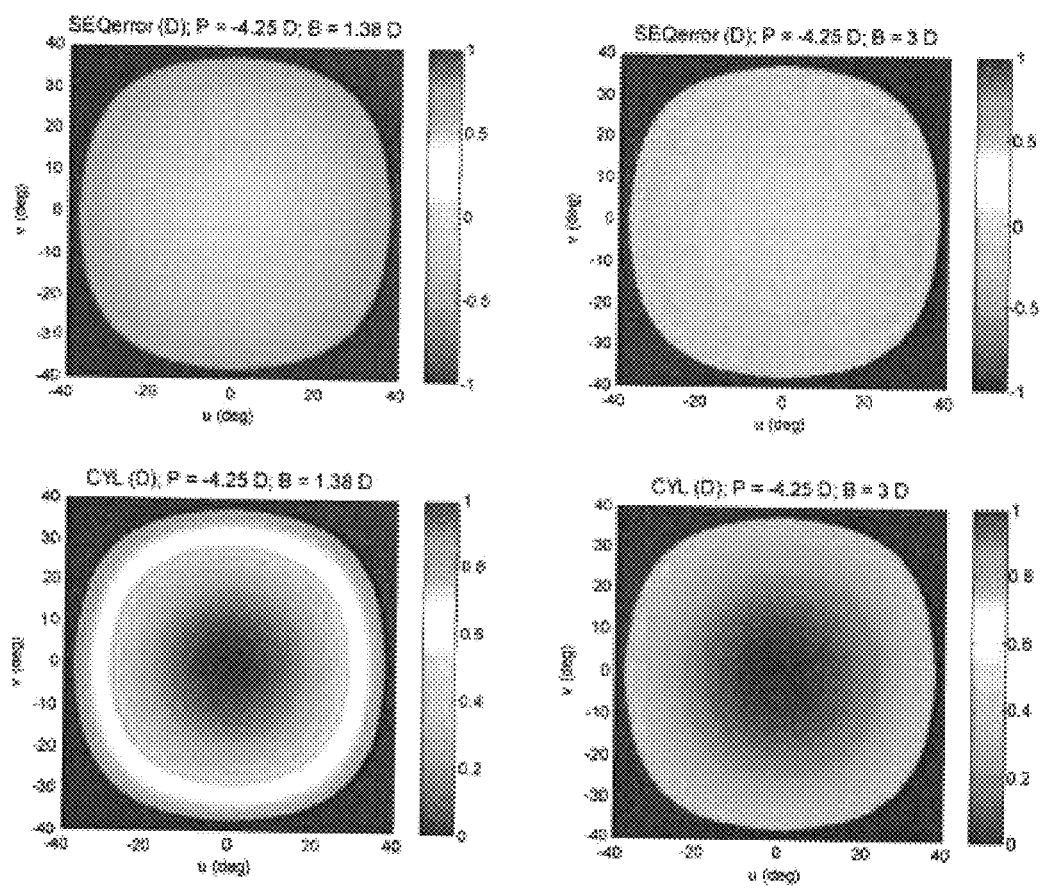
FIG. 4 shows an SEQ diagram and a CYL diagram of the two resin lenses in Example 2 of the present invention.

Two resin lenses with a refractive index of 1.67, the power of −4.25 and different front curves were shown in FIG. 3. Parameters were shown in Table 2. The SEQ and CYL of the lenses were tested respectively, as shown in FIG. 4.

TABLE 2

Two resin lenses with a refractive index of 1.67, the power of −4.25 and different front curves

| BC(D) n = 1.530 | R$_1$ (mm) | R$_2$ (mm) | P$_1$(D) n = 1.667 | P$_2$(D) n = 1.667 | t$_{edg}$(mm) |
|---|---|---|---|---|---|
| 1.38 | 384.06 | 111.35 | 1.74 | −5.99 | 5.85 |
| 3 | 176.67 | 82.95 | 3.78 | −8.04 | 6.04 |

In the table: BC is base curve, R1 and R2 are semicircle diameters based on two roundnesses, P1 is front curve, P2 is back curve (the refractive index used in the test was 1.667), t is the edge thickness of the lens, and 667/530*BC=P1.

As shown in FIG. 4, the smaller the SEQ of the resin lens with the design curve of −3.00 D, the better the CYL.

Example 3

Figure 5:
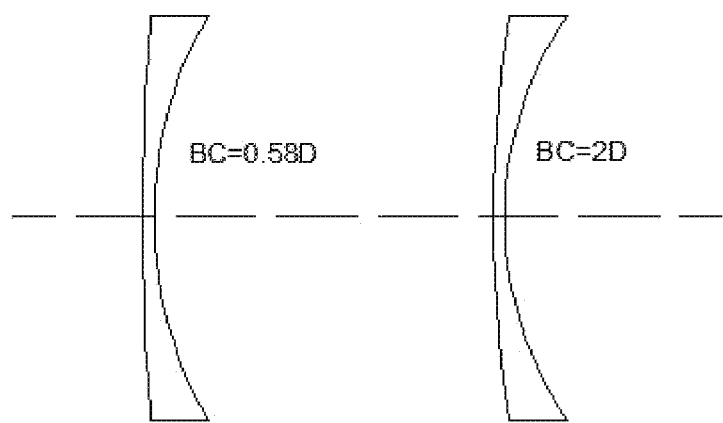
FIG. 5 shows schematic structural diagrams of two resin lenses in Example 3 of the present invention.
Figure 6:
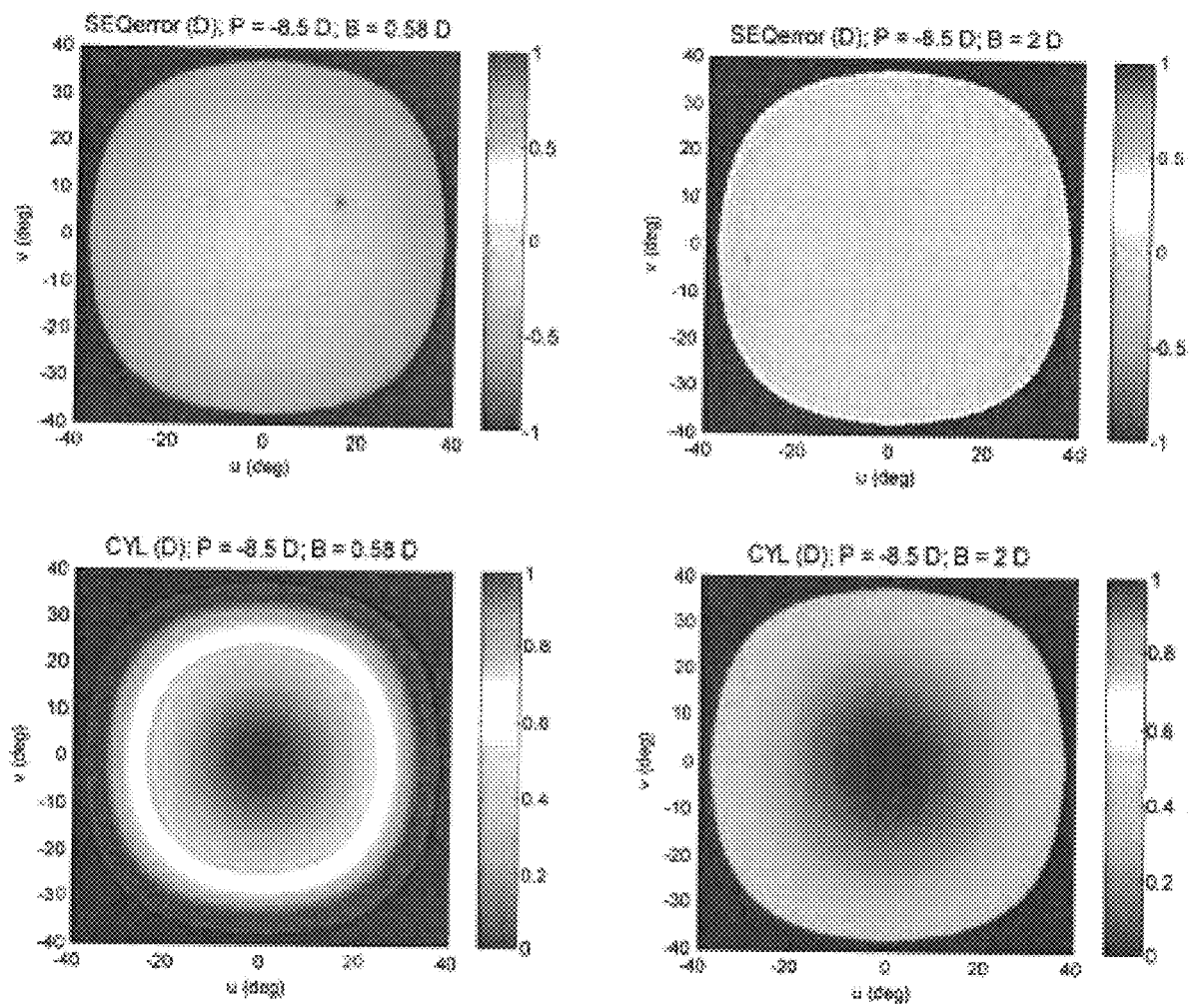
FIG. 6 shows an SEQ diagram and a CYL diagram of the two resin lenses in Example 3 of the present invention.

Two resin lenses with a refractive index of 1.67, the power of −8.50 and different front curves were shown in FIG. 5. Parameters were shown in Table 3. The SEQ and CYL of the lenses were tested respectively, as shown in FIG. 6.

TABLE 3

Two resin lenses with a refractive index of 1.67, the power of −8.50 and different front curves

| BC(D) n = 1.530 | R$_1$ (mm) | R$_2$ (mm) | P$_1$(D) n = 1.667 | P$_2$(D) n = 1.667 | t$_{edg}$(mm) |
|---|---|---|---|---|---|
| 0.58 | 913.79 | 72.26 | 0.73 | −9.23 | 10.17 |
| 2 | 265.00 | 60.51 | 2.52 | −11.02 | 10.63 |

In the table: BC is base curve, R1 and R2 are semicircle diameters based on two roundnesses, P1 is front curve, P2 is back curve (the refractive index used in the test was 1.667), t is the edge thickness of the lens, and 667/530*BC=P1.

As shown in FIG. 6, the smaller the SEQ of the resin lens with the design curve of 2 was smaller, the better the CYL.

Example 4

Figure 7:
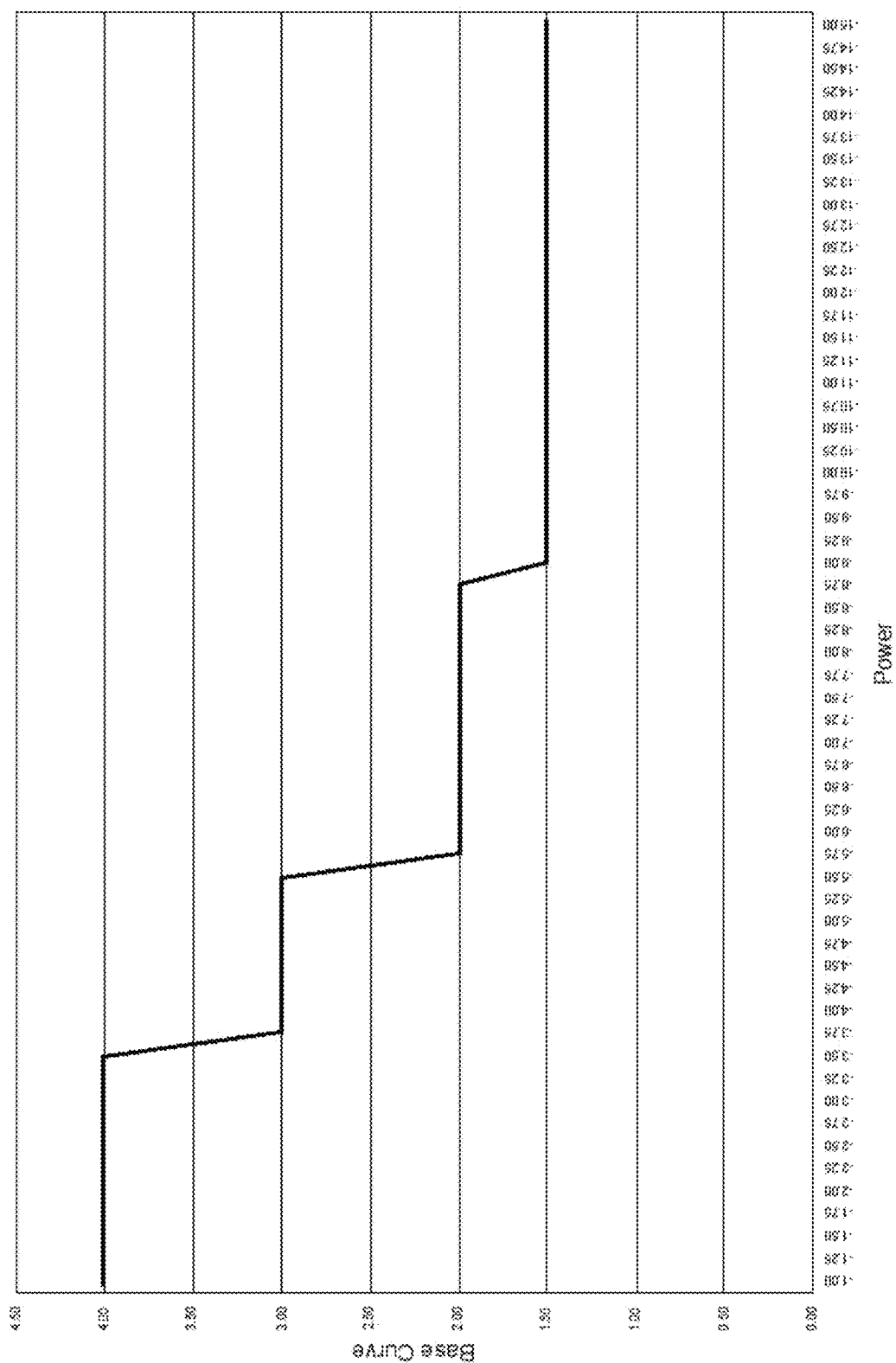
FIG. 7 shows a value range of front curve of a resin lens with the change of power in the design method of the present invention.

A spherical lens with a refractive index of 1.60 included a mixture of 2,5 (or 2,6)-bis(isocyanatomethyl)bicyclo [2.2.1]heptane, hexamethylene diisocyanate, pentaerythritol tetra(3-mercaptopropionate) and 4-mercaptomethyl-3,6-dithia-1,8-octanedithiol as a monomer and an organotin catalyst as a catalyst. The front curve of a geometric center point of the lens with the change of power was shown in FIG. 7.

Example 5

An aspheric lens with a refractive index of 1.67 included 1,3-bis(isocyanatomethyl)benzene and bis(mercaptomethyl)-3,6,9-trithiaundecane-1,11-dithiol as a monomer and an organotin catalyst as a catalyst. The front curve of a geometric center point of the lens with the change of power was shown in FIG. 7.

Example 6

An aspheric lens with a refractive index of 1.74 included bis(2,3-epithiopropyl)disulfide and bis(mercaptomethyl)-3, 6,9-trithiaundecane-1,11-dithiol as a monomer and an amine catalyst as a catalyst. The front curve of a geometric center point of the lens with the change of power was shown in FIG. 7.

The foregoing descriptions are only exemplary implementations of the present invention. A person of ordinary skill in the art may make some improvements and variations without departing from the technical principle of the present invention and the improvements and variations shall fall within the protection scope of the present invention.

What is claimed is:

1. A front curve design method for preparing a resin lens with a high refractive index, comprising within a myopia power range of −1.00 to −15.00, designing the maximum design front curve to be −4.00 D from −1.00 to −3.50; designing the maximum design front curve to be −3.00 D from −3.75 to −5.50; designing the maximum design front curve to be −2.00 D from −5.75 to −8.75; and designing the maximum design front curve to be −1.50 D from −9.00 to −15.00.

2. The front curve design method for preparing a resin lens with a high refractive index according to claim 1, wherein the maximum design front curve is the curve of a geometric center point of a lens.

3. The front curve design method for preparing a resin lens with a high refractive index according to claim 1, wherein the front curve design is used for a spherical lens, an aspheric lens or a multifocal lens.

4. The front curve design method for preparing a resin lens with a high refractive index according to claim 1, wherein the resin lens with a high refractive index is a lens with a refractive index of 1.60, 1.67 or 1.74.

5. The front curve design method for preparing a resin lens with a high refractive index according to claim 4, wherein the lens with a refractive index of 1.60 comprises a mixture of 2,5 (or 2,6)-bis(isocyanatomethyl)bicyclo[2.2.1] heptane, hexamethylene diisocyanate, pentaerythritol tetra (3-mercaptopropionate), and 4-mercaptomethyl-3,6-dithia-1,8-octanedithiol as a monomer and an organotin catalyst as a catalyst.

6. The front curve design method for preparing a resin lens with a high refractive index according to claim 4, wherein the lens with a refractive index of 1.67 comprises 1,3-bis(isocyanatomethyl)benzene and bis(mercaptomethyl)-3,6,9-trithiaundecane-1,11-dithiol as a monomer and an organotin catalyst as a catalyst.

7. The front curve design method for preparing a resin lens with a high refractive index according to claim 4, wherein the lens with a refractive index of 1.74 comprises bis(2,3-epithiopropyl)disulfide and bis(mercaptomethyl)-3,6,9-trithiaundecane-1,11-dithiol as a monomer and an amine catalyst as a catalyst.

\* \* \* \* \*